Aug. 24, 1926.
J. SCHIFTER
OUTLET STRAINER
Filed Nov. 14, 1925
1,596,894
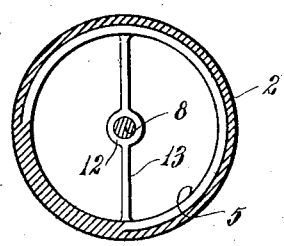
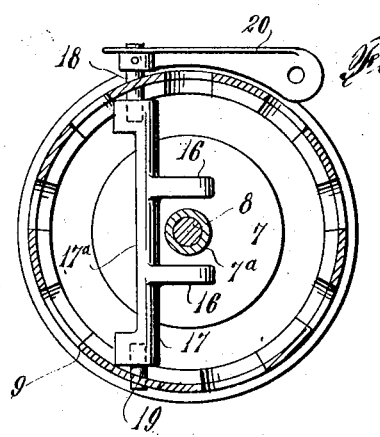
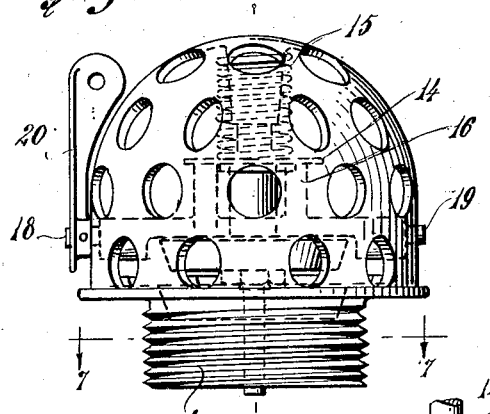
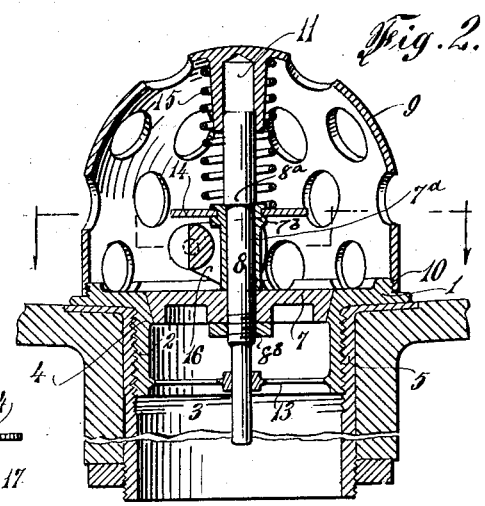
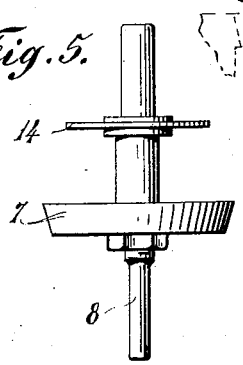
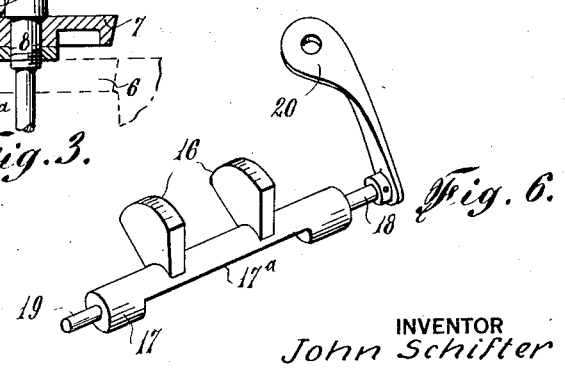
INVENTOR
John Schifter
BY
P. F. Bourne
ATTORNEY Patented Aug. 24, 1926.

1,596,894

UNITED STATES PATENT OFFICE.

JOHN SCHIFTER, OF NEW YORK, N. Y.

OUTLET STRAINER.

Application filed November 14, 1925. Serial No. 68,936.

The object of my invention is to provide a device including a strainer and valve or plug adapted to be inserted in outlets of basins, tubs and the like, to control the flow of water therefrom and to serve as a strainer for the outlet.

In carrying out my invention I provide a base member having a valve seat, a perforated casing connected with the base and containing a valve or plug to close against said seat, and a movable member supported in position to move said valve or plug from its seat and retain it unseated for straining purposes and to cause said valve or plug to be seated to close the outlet.

My invention comprises novel details of improvement that will be more fully hereinafter set forth and then pointed out in the claims.

Reference is to be had to the accompanying drawings forming a part hereof wherein Fig. 1 is a side view of an outlet strainer embodying my invention;

Fig. 2 is a vertical section of Fig. 1 showing the valve closed;

Fig. 3 is a sectional detail illustrating the valve in open position;

Fig. 4 is a section on line 4, 4, in Fig. 2;

Fig. 5 is a detail of the valve member;

Fig. 6 is a perspective detail of the valve actuating member; and

Fig. 7 is a section on line 7, 7, in Fig. 1.

Similar numerals of reference indicate corresponding parts in the several views.

At 1 is indicated a base member shown provided with a tubular extension 2 to seat in an outlet 3 of a basin, tub or the like. Extension 2 is shown externally threaded at 4 to mesh with threads in an internally threaded fitting 5, which may be of the character usually inserted in outlets for basins, tubs and the like, whereby the base 1 may be detachably secured in the outlet. The member 1 is provided with a seat 6 adapted to receive a valve or plug 7 to fit against said seat to close the outlet. The valve is guided by means of a stem 8 centrally disposed in the valve. At 9 is a perforated casing or shell attached to the base 1, as by screw threads at 10, so that said parts may be detached. The casing or shell 9 is shown provided with a bore 11 axially disposed and receiving the stem 8 at the upper portion, the lower end of the stem being shown guided in an aperture 12 in a brace or spider 13 that extends across the tubular extension 2, whereby the valve may be raised and lowered respecting the seat. About the valve is a tubular piece 7$^a$ slidable on stem 8 and to which an enlargement or disk 14 is attached that is spaced from the upper surface of the valve. The enlargement 14 rests against a shoulder 7$^b$ on piece 7$^a$ and the outer end of the latter is riveted over the enlargement to retain it. The stem 8 has a shoulder 8$^a$ against which the piece 7$^a$ bears and a nut 8$^b$ on the stem bears against the valve to force it against the piece 7$^a$ and force the latter against the shoulder 8$^a$, whereby the valve, the stem and the enlargement are secured together as a unit. A spring at 15, shown interposed between the top portion of the casing or shell 9 and the enlargement or disk 14, serves normally to press the valve to its seat for closing the outlet.

I provide one or more projections or cam-like members 16 extending from a shaft 17 that is journaled transversely in the casing or shell 9, said extensions and shaft being located between valve 7 and its enlargement 14. The outer ends of the projections 16 are shown curved in such a way as to operate against the enlargement 14 for raising the valve from the seat. The shaft may be journaled in the casing or shell by means of pivots 18, 19 which may be passed through journal holes in the casing and into corresponding bores in the ends of the shaft after the latter has been inserted within the casing 9, (Fig. 4). The shaft is provided with an operating member or handle 20 located along the exterior of casing 9 and shown secured to the pivot 18, whereby shaft 17 may be rotated. The projections 16 are preferably spaced apart on opposite sides of the stem 8 to cooperate together with the enlargement or disk 14 for operating the valve in a balanced way, so that substantially equal lifting effect will be applied to the valve on opposite sides of the stem when shaft 17 is rotated to unseat the valve. By preference one side of the shaft 17 is reduced or cut away at 17$^a$, at the portion over the valve or plug 7, so that when the shaft is rotated to raise the valve from its seat the latter may enter the reduced portion 17$^a$ of the shaft, as indicated in Fig. 3, with the valve opposing the shaft, whereby the flat surface of the reduced portion 17$^a$ of the shaft will engage the valve, serving to keep the shaft from rotating reversely to close the valve on its seat unless manually operated. The operating member 20 may be connected with a chain extending without the basin or the like for manipulating the valve without requiring the operator to put his or her hands in the water in the basin.

In accordance with my invention the base 1 may be attached to an outlet for a tub or the like in the manner indicated in the drawings, and in such a position that the perforated casing or shell 9 within the basin will act as a strainer and also a protector of the valve. When it is desired to use the valve as a stopper the shaft 17 will be appropriately rotated so that its projections 16 will operate from the position shown in Fig. 1, wherein the valve 7 is shown in the open position, to the position shown in Fig. 2, wherein the valve is in the closed position, so that the basin or the like may be charged with water as much as desired. When the water is to be drained the shaft 17 is rotated reversely to cause its projection 16 to raise the valve from its seat and the flat surface 17$^a$ of the shaft will engage the upper surface of the valve and retain the valve in the open position. The spring 15 serves to force the valve to its seat when the shaft has been sufficiently rotated in the appropriate direction from the position for retaining the valve open, and also to maintain the valve against its seat. The spring is of advantage although the device is operable without the spring.

Changes may be made in the details of construction set forth, within the scope of the appended claims, without departing from the spirit of my invention.

Having now described my invention what I claim is:

1. A device of the class described comprising a base having a seat, a perforated casing secured to the base, a valve to close against the seat, and an operative member for the valve movably supported by the casing above the valve to unseat the valve.

2. A device as set forth in claim 1, in which the operative member includes a shaft provided with one or more projections and the valve is provided with means cooperative with the projections to unseat the valve.

3. A device of the class described comprising a base having a seat, a perforated casing secured to the base, a valve to close against said seat, means for guiding the valve for movement toward and from the seat, a valve operating member movably carried by the casing for raising the valve from the seat, and means exterior to the casing to actuate said member.

4. A device as set forth in claim 3, in which the operating member comprises a shaft journaled upon the casing and provided with one or more projections to actuate the valve.

5. A device of the class specified comprising a base having a seat, a valve to close against the seat, an enlargement spaced from the valve and connected thereto, means to guide the valve for movement toward and from the seat, and a shaft journaled transversely of the device and provided with one or more projections, the shaft and its projections being located between the valve and its enlargement for actuating the valve.

6. A device as set forth in claim 5, in which the shaft is provided with a reduced portion on one side adapted to oppose the valve when the latter is retained unseated by the said projections.

7. A device as set forth in claim 5, provided with a spring located between the casing and the enlargement to force the valve to its seat when the shaft has been sufficiently rotated from the position for retaining the valve open.

JOHN SCHIFTER.